United States Patent Office 3,004,290
Patented Oct. 17, 1961

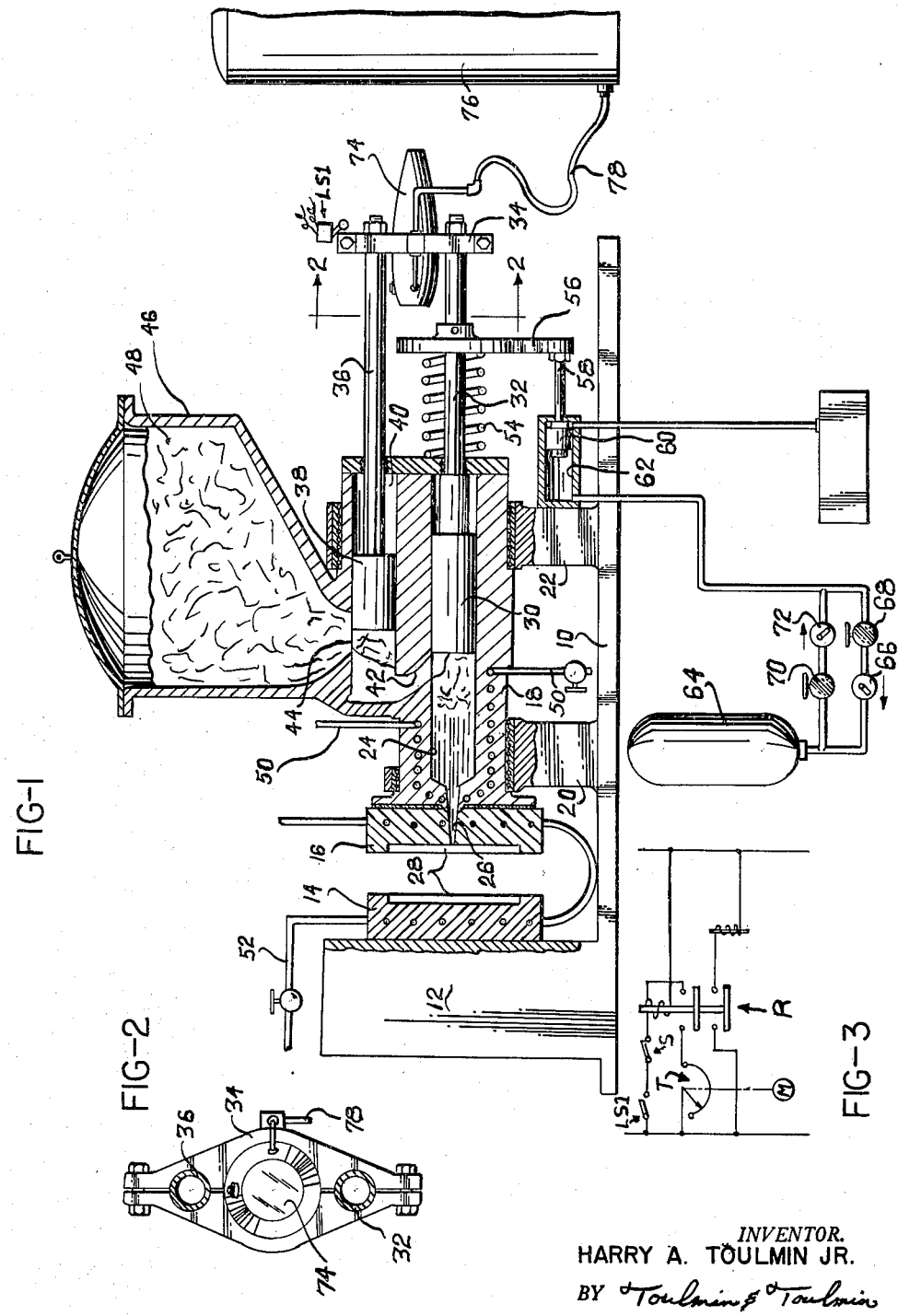

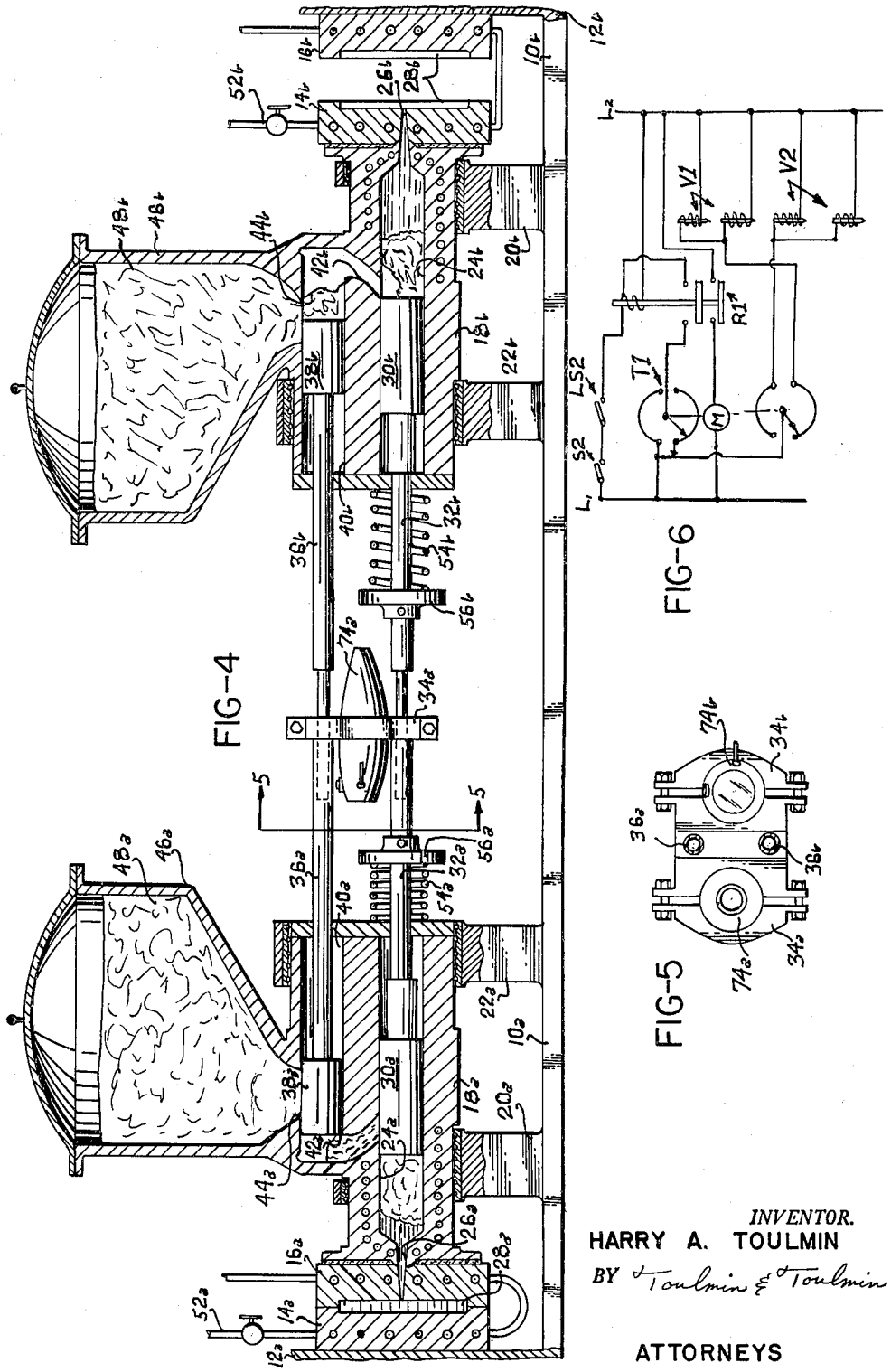

3,004,290
APPARATUS FOR MOLDING PLASTIC
MATERIALS
Harry A. Toulmin, Jr., Dayton, Ohio, assignor to The
Commonwealth Engineering Company of Ohio, Dayton, Ohio, a corporation of Ohio
Filed Apr. 30, 1956, Ser. No. 581,720
5 Claims. (Cl. 18—30)

This invention relates to a molding press and to a method of operation thereof, and is particularly concerned with the application of a novel type of thrust generator to a plastic molding press.

Plastic molding presses of the nature which convert granular material to a plastic mass by the application of heat thereto, and then compact this mass into a mold cavity under pressure, are well known and heretofore have taken the form of mechanically or hydraulically actuated press mechanisms.

Most modern plastics are also adapted for being handled with presses of this nature, but a great many of these plastic materials are characterized in possessing a much higher degree of fluidity than was present with former plastic materials. Because of this higher fluidity of the plastic materials, it becomes possible to move the material at a higher speed into a mold cavity.

Such plastic material upon being chilled in the mold cavity commences quickly to set up, and it is therefore also important that the plastic material be rammed into the mold cavity under a high pressure to be certain of filling completely all of the space within the mold body.

According to the present invention, a novel power developing device is employed in connection with a plastic molding press, which permits extremely high speed operation while at the same time exerting the high pressure on the material within the mold cavity that is necessary to obtain a sound casting.

In brief, the present invention proposes the application of a jet or rocket engine to a plastic molding press to drive the mold parts closed, and to drive the plastic molding plunger in its material transferring direction.

The utilization of the present invention permits of the construction of both large and small pressing units and the operation thereof at as high a speed as is necessary, and with the development of whatever pressures are necessary, all without the necessity of handling large volumes of hydraulic fluid and without utilizing bulky and expensive mechanical linkages. The exact nature of the present invention will become more clearly apparent upon reference to the following specification taken in connection with the accompanying drawings, in which:

FIGURE 1 is a sectional view more or less diagrammatic of a plastic molding machine constructed according to the present invention in retracted position;

FIGURE 2 is a sectional view indicated by line 2—2 on FIGURE 1, showing the manner in which the motor is mounted that drives the mold parts closed, and which also drives the molding plunger;

FIGURE 3 is a diagrammatic view showing an electric control circuit for the machine;

FIGURE 4 is a sectional view, like FIGURE 1, but shows a double-ended molding machine wherein one end of the machine is always active and the other end inactive;

FIGURE 5 is a sectional view indicated by line 5—5 on FIGURE 4, showing the dual motor mounting associated with the machine; and FIGURE 6 is a diagrammatic view showing an electric control circuit for the arrangement of FIGURE 5.

Referring to the drawings somewhat more in detail, FIGURE 1 shows a machine comprising a frame 10 which comprises a stationary bolster portion 12 that supports the stationary portion 14 of a mold that has a movable portion 16 that may advantageously be mounted on the end of a movable cylinder 18. Cylinder 18 is reciprocably guided in the portions 20 and 22 upstanding from the bottom part of frame 10.

Cylinder 18 has a bore 24 therein that communicates through a sprue passage 26 with the cavity 28 of the mold.

A plunger 30 is reciprocably mounted in bore 24 so as to displace plastic material therefrom through the said sprue passage into the mold cavity upon leftward movement of the plunger within the bore.

Connected with plunger 30 and extending out the right end of cylinder 18 is a rod 32 connected at its extreme right end to cross head 34 to which is also secured a feed rod 36 having at its left end a feed plunger 38 reciprocably mounted in a bore 40 that communicates at its left and via a passage 42 with bore 24, and communicates at a point rightwardly therefrom as at 44 with a hopper 46 containing granulated plastic material 48.

It will be seen that when feed plunger 38 moves leftwardly the plastic material to the left thereof is pushed over to the point where it will drop through passage 42 on top of plunger 30, and then upon rightward movement of plungers 30 and 38 this material will then drop into bore 24 ahead of plunger 30 while a new change of material drops from hopper 46 into bore 40 ahead of plunger 38. As is known, this arrangement is self-regulating so that a preliminary adjustment of the plungers 30 and 38 relative to each other is all that is required to maintain the machine in continuous operation.

The plastic material delivered to bore 24 is softened therein or even made completely fluid by heating at least the left end of cylinder 18 as by hot fluid delivered thereto via conduit means 50 and flowing about passage means associated with the cylinder.

Similarly, the mold parts 14 and 16 are maintained cool, so that the plastic material delivered thereto sets up quickly by a cooling fluid passed through the mold parts by way of a conduit means 52.

The plungers 30 and 38 are urged rightwardly in their respective bores by a compression spring 54 bearing between the right end of cylinder 18 and a plate member 56 secured to rod 32. This plate member is also connected by rod 58 with piston 60 in cylinder 62. The right end of cylinder 62 is vented and the left end thereof is connected with an accumulator 64, so that fluid will flow from the cylinder 62 to the accumulator via check valve 66 and pressure relief valve 68, and will flow from the accumulator to cylinder 62 via throttle or pressure relief valve 70 and check valve 72.

Cross head 34 is availed of for supporting a jet or rocket propulsion unit 74 which may be supplied with fluid in any desired manner, but is preferably connected with a source 76 of liquid fuel which is arranged to be supplied thereto by flexible conduit 78 that includes any suitable sort of control valve means.

FIGURE 3 shows a typical electric control circuit for the machine. In this figure, relay R is adapted for being closed when limit switch LS-1 is closed by cross head 34 at the end of a retraction stroke, and the manual selector switch S is also closed. Energization of the relay will establish a holding circuit therefor through a timer T, which will automatically open the holding circuit after a predetermined time delay, energization of the relay also energizing a fuel supply valve and igniter V which will cause firing of the propulsion unit 74.

When the unit 74 fires; cylinder 18, plungers 30 and 38 move leftwardly as a unit until mold parts 14 and 16 engage each other. Thereafter, only plungers 30 and 38 move leftwardly, and this displaces plastic material from bore 24 into the mold cavity. When timer T times out, the firing of 74 is interrupted thus permitting spring 54 to commence retraction of plungers 30 and 38 in their respective bores, while simultaneously accumulator 64 discharges through valves 70 and 72 to the left end of cylinder 62 and forces plate 56 rightwardly, thus carrying with it plungers 30 and 38 and cylinder 18.

The mold parts 14 and 16 may advantageously comprise automatic knockout devices, so that at the end of a retraction stroke the molded parts will be removed from the mold cavity. At this time, if switch S is closed a new cycle will be initiated, but if this switch is open the new cycle will be initiated only when the said switch is manually actuated.

It will be seen from the foregoing that the main jet or rocket propulsion unit supplies all of the power for operating the press, thereby eliminating pumps and valves and heavy and expensive hydraulic cylinders, and the necessity of moving large quantities of hydraulic fluid into and out of hydraulic clamping motors and the like.

The modifications of FIGURES 4, 5 and 6 is substantially identical with the previously described modifications, except that a double-ended machine is illustrated wherein one end is performing a molding operation while the other end is retracting.

The parts of the structure FIGURE 4 which are identical with those of the FIGURE 1 modification are correspondingly numbered with the addition of a subscript $a$ to the left side of FIGURE 4 and a subscript $b$ to the right side of FIGURE 4.

The essential difference between the FIGURE 4 modification and that of FIGURE 1 resides in the provision of two combustion-operated propulsion units 74a and 74b which fire alternately so that the parts of the device are driven in both directions by the rocket or jet propulsion means, thereby eliminating the provision of any hydraulic auxiliaries whatsoever such as the accumulator 64 and piston and cylinder means 60, 62 of the FIGURE 1 modification.

The FIGURE 4 modification may be controlled by the control circuit illustrated in FIGURE 6 wherein there is a relay R-1, the solenoid of which is in circuit with a limit switch LS-2 that is closed when the parts of the press reach their center position. Selector switch S-2 is employed to initiate and halt operation of the press. When relay R-1 is energized, a holding circuit therefor is established through a timer mechanism T-1, which predetermines a definite interval of energization for the said relay.

When relay R-1 is energized, and the timer is in the position shown, the fuel supply means and igniter means V-1 for the rocket motor 74a that drives the parts of the molding press leftwardly is effective, whereas when the said relay is energized and the timer T-1 is in its other position igniter means V-2 for the other rocket motor 74b that drives the press parts rightwardly becomes effective for a predetermined interval of time that is determined by the setting of timer T-1.

From the foregoing, it will be apparent that a plastic molding press according to my invention embodies the fewest number of parts, particularly with respect to the power unit, while still providing ample power for operating even the largest press, while making available a type of power that will permit exceedingly rapid operation of the press and also the high compacting forces necessary to produce superior molded work pieces by completely filling the cavity in the molds.

It will be understood that I desire to comprehend within my invention any type of combustion-operated propulsion means that provide for sufficient power to carry out a complete molding cycle. Thus, while I prefer to use liquid fuel in a jet or rocket type engine, it is also conceivable that the fuel which I might employ might be in the form of measured charges of solid fuel arranged to burn at a controlled rate in order to produce the general propulsion effect which is availed of according to the present invention for driving the molding press.

It will be understood that this invention is susceptible to modification in order to adapt it to different usages and conditions, and, accordingly, it is desired to comprehend such modifications within this invention as may fall within the scope of the appended claims.

I claim:

1. In a molding press: a press frame, a stationary mold half mounted in said frame, an injection cylinder slidable in said frame, a movable mold half mounted on the discharge end of said cylinder adapted for engaging such stationary mold half and defining a mold cavity, a plunger reciprocable in said cylinder to displace molding material therefrom into said mold cavity; means for heating the cylinder to soften the material therein, a hopper mounted on the cylinder and feed means operable in response to reciprocation of the said plunger in the cylinder for feeding molding material from said hopper to said cylinder, spring means acting between said plunger and cylinder to resist advancing movement of the plunger in the cylinder, fluid operable means for urging said plunger in its retracting direction, combustion-operated thrust generating means connected with said plunger energizable for driving the plunger in its advancing direction and also for charging said fluid operable means, said fluid operable means and said spring means being operable for returning said plunger and said cylinder to retracted position upon de-energization of said thrust generating means.

2. In a molding press: two molds, each comprising mold halves, each outer mold half being stationary; said outer mold halves being in spaced facing relation, an injection cylinder supporting each inner mold half in opposition to its pertaining outer mold half, said injection cylinders being supported for sliding movement; an injection plunger in each injection cylinder, said plungers being connected together, spring means urging said plungers in their retracting direction in their respective cylinders; a pair of oppositely directed combustion-operated thrust generating means connected with said plungers and sequentially operable for closing first one mold and actuating its relation injection plunger, and for then closing the other mold and operating its related injection plunger while simultaneously opening the first mentioned mold and retracting the injection plunger related therewith.

3. In a molding press, a stationary mold part, a complementary movable mold part adapted to be closed against the stationary mold part to define a mold cavity, a cylinder mounted on said movable mold part and communicating with said mold cavity, an injection plunger reciprocable in said cylinder for moving molding material therefrom into said mold cavity; spring means urging said plunger toward retracted position in said cylinder, and a jet propelled means connected with said plunger for closing said mold parts and advancing said plunger in said cylinder to move molding material into said mold cavity, and jet propelled means for causing retraction of said plunger and opening of said mold parts.

4. In a molding press, a stationary mold half, a complementary movable mold half defining a mold cavity, a cylinder supporting said movable mold half; said cylinder communicating with said mold cavity defined by said mold halves, a plunger reciprocable in said cylinder to move molding material therefrom into said mold cavity, spring means urging said plunger toward retracted position in said cylinder, fluid operable means urging said plunger toward a predetermined retracted position, and jet propulsion means connected with said plunger for driving said plunger to inject molding material from said cylinder into the mold cavity, said spring being operable to close said mold halves and together with said fluid operable means bring about retraction of said plunger and opening of said mold halves upon de-energization of said jet propulsion means.

5. In extrusion molding press, a stationary mold half, a complementary movable mold half defining a mold cavity, cylinder means fixed to said movable mold half and movable therewith, said cylinder communicating with said mold cavity defined by said mold halves, a plunger reciprocable in said cylinder to move molding material therefrom into said mold cavity, spring means urging said plunger toward retracted position in said cylinder, fluid operable means coacting with said spring means for urging said plunger toward a predetermined retracted position, and a rocket jet propulsion means mounted on a slidable crosshead and connected with said plunger for driving said plunger and to inject molding material from said cylinder into the mold cavity, said spring urging movement of said movable mold half and associated cylinder means to close said mold halves and together with said fluid operable means bring about retraction of said plunger and opening of said mold halves upon de-energization of said jet propulsion means.

References Cited in the file of this patent

UNITED STATES PATENTS

| | | |
|---|---|---|
| 2,479,433 | Tucker | Aug. 16, 1949 |
| 2,556,795 | Cannon | June 12, 1951 |
| 2,600,958 | Barton | June 17, 1952 |
| 2,628,473 | Frye | Feb. 17, 1953 |